United States Patent
Hertz et al.

(10) Patent No.: US 8,620,110 B2
(45) Date of Patent: Dec. 31, 2013

(54) METHOD AND SYSTEM FOR DISTRIBUTING DIGITAL IMAGES

(75) Inventors: Richard J. Hertz, Boulder, CO (US); Scott P. Robertson, Philadelphia, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 959 days.

(21) Appl. No.: 09/737,371

(22) Filed: Dec. 15, 2000

(65) Prior Publication Data
US 2004/0202384 A1    Oct. 14, 2004

(51) Int. Cl.
*G06K 9/00*    (2006.01)

(52) U.S. Cl.
USPC ........................................................ 382/305

(58) Field of Classification Search
USPC ........ 434/130–153; 345/760, 750; 348/207.1, 348/552, 231.3, 231.5, 231.2; 710/303; 709/200, 226; 382/305; 707/1–6, 104.1
See application file for complete search history.

(56) References Cited

U.S. PATENT DOCUMENTS

| | | | |
|---|---|---|---|
| 5,737,491 A | 4/1998 | Allen et al. | |
| 5,917,542 A | 6/1999 | Moghadam et al. | |
| 5,920,856 A * | 7/1999 | Syeda-Mahmood | 1/1 |
| 6,035,055 A * | 3/2000 | Wang et al. | 382/118 |
| 6,163,622 A * | 12/2000 | Abdel-Mottaleb et al. | 382/170 |
| 6,167,469 A * | 12/2000 | Safai et al. | 710/62 |
| 6,202,061 B1 * | 3/2001 | Khosla et al. | 707/3 |
| 6,337,712 B1 * | 1/2002 | Shiota et al. | 348/231.1 |
| 6,405,049 B2 * | 6/2002 | Herrod et al. | 455/517 |
| 6,480,627 B1 * | 11/2002 | Mathias et al. | 382/224 |
| 6,571,246 B1 * | 5/2003 | Anderson et al. | 707/10 |
| 6,571,271 B1 * | 5/2003 | Savitzky et al. | 709/200 |
| 6,968,366 B1 * | 11/2005 | Zhang et al. | 709/219 |

* cited by examiner

*Primary Examiner* — Wesley Tucker
(74) *Attorney, Agent, or Firm* — Banner & Witcoff, Ltd.

(57) ABSTRACT

A system and method are provided for distributing digital images to a user. The system includes an image capture device for creating digital images, and at least one image server in communication with the image capture device via a communication network, such as the Internet. The image server is operable to receive and store the digital images transmitted from the image capture device. At least one programmable software agent in communication with the image server via the communication network automatically selects a subset of the digital images provided by the image server for distribution to the user. The system further includes one or more display devices for displaying the digital images selected by the software agent.

16 Claims, 4 Drawing Sheets

METHOD AND SYSTEM FOR DISTRIBUTING DIGITAL IMAGES

TECHNICAL FIELD

This invention relates to a method and system for the distribution of digital images to a user.

BACKGROUND ART

The area of digital photography is growing rapidly. Many consumers own digital cameras, and are interested in the ability to e-mail electronic photographs to friends and family members. In addition, images from traditional cameras are increasingly being provided to end users in electronic form.

Digital cameras, scanners, and other image capture devices currently capture images and store them internally on an electronic medium of some kind. The images must then be transferred manually from the image capture device to an image manipulation or display device, such as a personal computer, via cables, diskettes, or the like. Once image files have been created and stored on a computer, they can be sent to others.

In the current state of technology, the distribution and treatment of digital photographs is handled much like that of conventional photographs. More specifically, the distribution of digital images is accomplished by point-to-point electronic transmission capabilities such as email, file transfer over LANs and WANs, or use of physical memory devices. The display of digital images must then be controlled by end users once they gain possession of the image files. For example, a user might transfer an image file into a display device where it will be displayed until the user turns it off or replaces it with another file.

The aforementioned processes for distributing digital images are cumbersome and time-consuming, since the images must be manually transferred from the image capture device for distribution, and then require manipulation by the receiver in order to be displayed. Furthermore, an end user is not able to easily search for or select digital images.

DISCLOSURE OF INVENTION

Therefore, it is a principal object according to the present invention to provide a method and system for more directly and automatically distributing digital images from image capture devices to image display devices.

Accordingly, a system for distributing digital images to a user is provided which includes an image capture device for creating the digital images. The system further includes at least one image server in communication with the image capture device, where the image server is operable to receive and store the digital images transmitted from the image capture device. Still further, the system includes at least one programmable software agent in communication with the image server, where the software agent automatically selects a subset of the digital images provided by the image server for distribution to the user.

In one embodiment of the present invention, the software agent is operable to monitor, or poll, the image server for digital images. In another embodiment, the image server is operable to push digital images to the software agent for selection. The digital images preferably include metadata containing information about the digital images, such that the software agent can compare programmed criteria with the digital image metadata to select the appropriate subset of digital images for distribution to the user.

The system preferably includes one or more display devices for displaying the digital images selected by the software agent. The software agent can be associated with the display devices or, alternatively, the software agent can be associated with a central processor in communication with the display devices. In the latter embodiment, the central processor can include programmable software agents corresponding to each of the one or more display devices.

The display devices are preferably connected to a home network, and the software agent and the image server are in communication via a broadband network. In one embodiment, the image capture device is in communication with the image server via a wireless communication link. In an alternative embodiment, the image capture device is in communication with the image server via a synchronization cradle, such as a docking station.

Correspondingly, a method for distributing digital images to a user is provided. The method includes creating the digital images using an image capture device, and transmitting the digital images from the image capture device to at least one image server. The method further includes receiving and storing the digital images at the image server, and automatically selecting a subset of the digital images for distribution to the user using at least one programmable software agent in communication with the image server. Lastly, the method includes displaying the digital images selected by the software agent.

According to the present invention, the method can include monitoring the image server for digital images using the software agent, or pushing digital images from the image server to the software agent. Still further, the process of automatically selecting the subset of the digital images for distribution to the user preferably includes comparing programmed criteria with metadata provided for the digital images.

The above objects as well as other objects, features, and advantages of the present are more readily understood following a review of the attached drawings and the accompanying specification and claims.

BEST MODE FOR CARRYING OUT THE INVENTION

Figure 1:
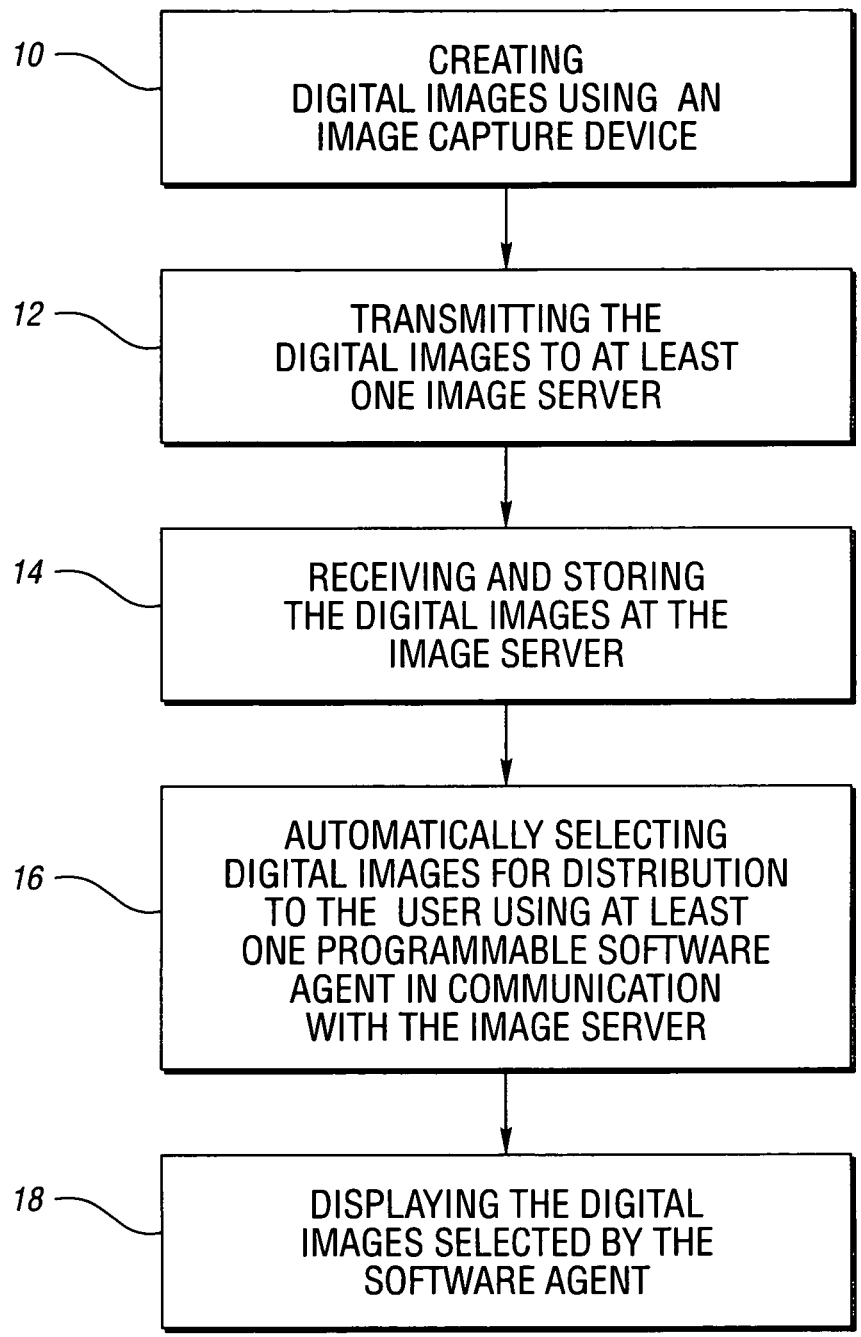
FIG. 1 is a flow diagram illustrating the method of distributing digital images according to the present invention.

Referring first to FIG. 1, the method of distributing digital images according to the present invention is illustrated. As shown at block 10, the method includes creating digital images using an image capture device. Next, as shown at block 12, the method includes transmitting the digital images to at least one image server. The method further includes receiving and storing the digital images at the image server, as shown at block 14. Still further, the method includes automatically selecting digital images for distribution to the user using at least one programmable software agent in communication with the image server, as shown at block 16. Lastly, as shown at block 18, the method includes displaying the digital images selected by the software agent.

Figure 2:
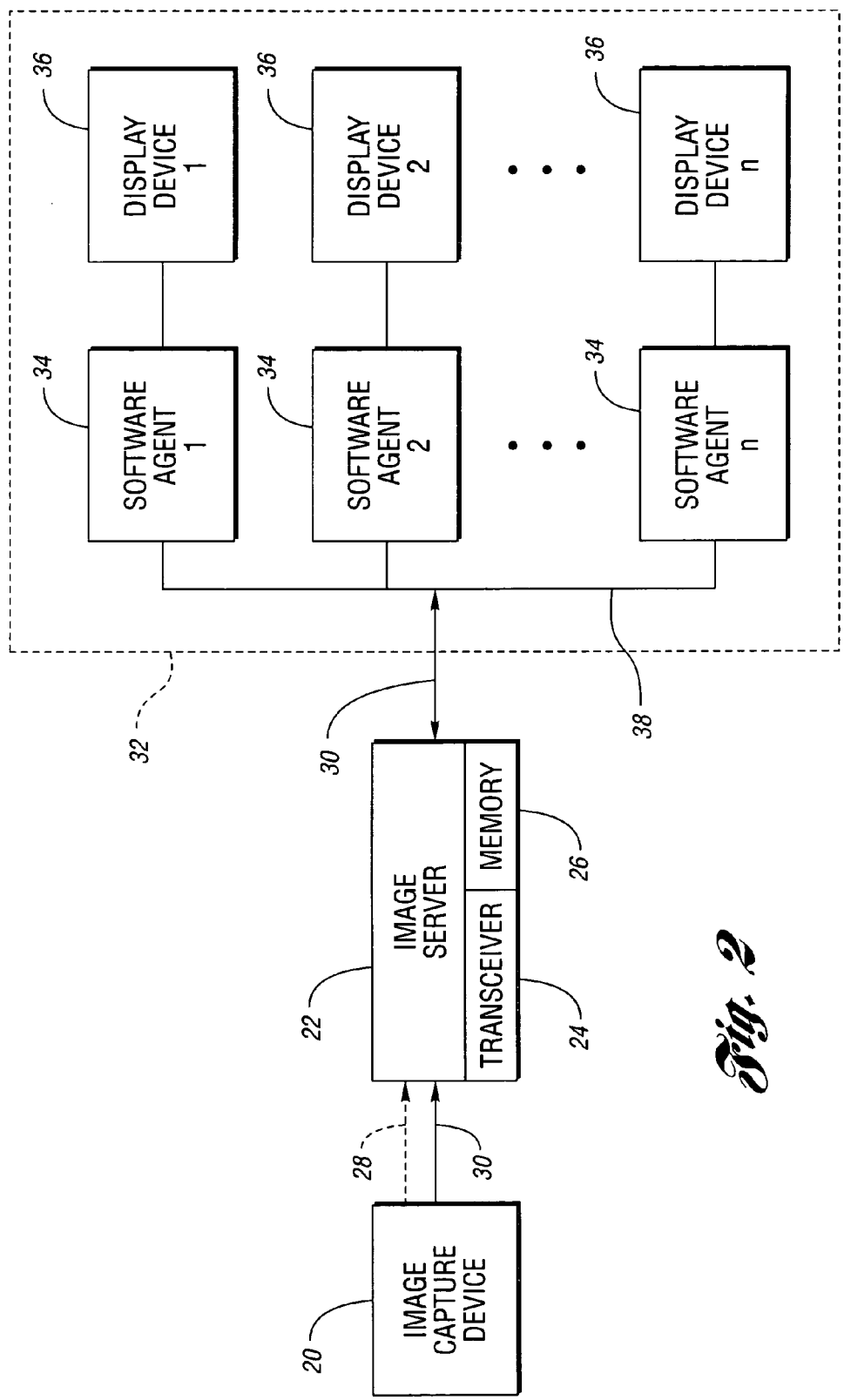
FIG. 2 is a system for distributing digital images according to the present invention.

A system for carrying out the method of the present invention is depicted in FIG. 2. The system includes an image capture device 20 for creating digital images. Examples of suitable image capture devices 20 include digital cameras, scanners, video cameras, or any other device capable of creating a digital image. The system further includes at least one image server 22 in communication with image capture device 20, where image server 22 is operable to receive and store digital images transmitted from image capture device 20. More specifically, each image server 22 includes a transceiver 24 for receiving a digital image file, and a memory 26 for storing the received digital image file.

Depending on the type of image capture device 20, there are several possibilities for transmission of digital images to image server 22. In one embodiment, image capture device 20 can transmit digital images to image server 22 via a wireless communication link 28. In an alternative embodiment, image capture device 20 can communicate with image server 22 using a wireline transmission, preferably via a broadband network 30 such as the Internet. Wireline transmission can be accomplished by placing image capture device 20, such as a digital camera, in a synchronization cradle, or docking station (not shown). Alternatively, if a digital image capture device is not used, photographs from a conventional camera can be scanned, digitized, and transmitted to image server 22. It is understood that digital images described herein are not limited to still photographs, but also include digital video and other images with multimedia content.

As shown in FIG. 2, image servers 22 are connected to end user premises 32 via broadband network 30. In this way, digital images can be available to end users connected to broadband network 30 as soon as the digital images are received at image server 22. This makes it possible, for example, for a person to take a picture in a remote location and make it available for display by another party almost immediately.

Still further, the system includes one or more programmable software agents 34 in communication with image server 22 via broadband network 30. According to the present invention, a software agent 34 automatically selects a subset of the digital images provided by image server 22 for distribution to end user premises 32. Software agents 34 used programmed criteria, such as the photograph source or type, to evaluate and select digital images. In one embodiment, software agent 34 is operable to monitor, or poll, one or more image servers 22 for digital images to download for display. Image servers 22 include software capable of handling requests from software agents 34, and image servers 22 can negotiate with software agents 34 for images. In another embodiment, image server 22 is operable to push digital images to software agents 34 for evaluation and selection. Such pushes could specify addresses, demographic information, or any other relevant target information. Software agents 34 then automatically select, or even purchase, digital images and download them at user premises 32.

With further reference to FIG. 2, software agents 34 are operable to display the selected digital images in particular display devices 36 throughout user premises 32. Display devices 36 are programmed to receive digital images, and examples include personal computers, hand-held computers, television sets, web tablets, electronic picture frames, electronic wall posters, and digitally-enabled appliances. All display devices 36 are preferably connected to a home network 38, which is in turn connected to broadband network 30 so that software agents 34 can communicate with image servers 22 and digital images can be selected, downloaded, and displayed. Each display device 36 can select digital images using software agents 34 either by polling image servers 22 or receiving images pushed from image servers 22. Therefore, the use of software agents 34 provides display devices 36 themselves with the capability to find digital images from many distributed sources and display the images automatically.

Figure 3:
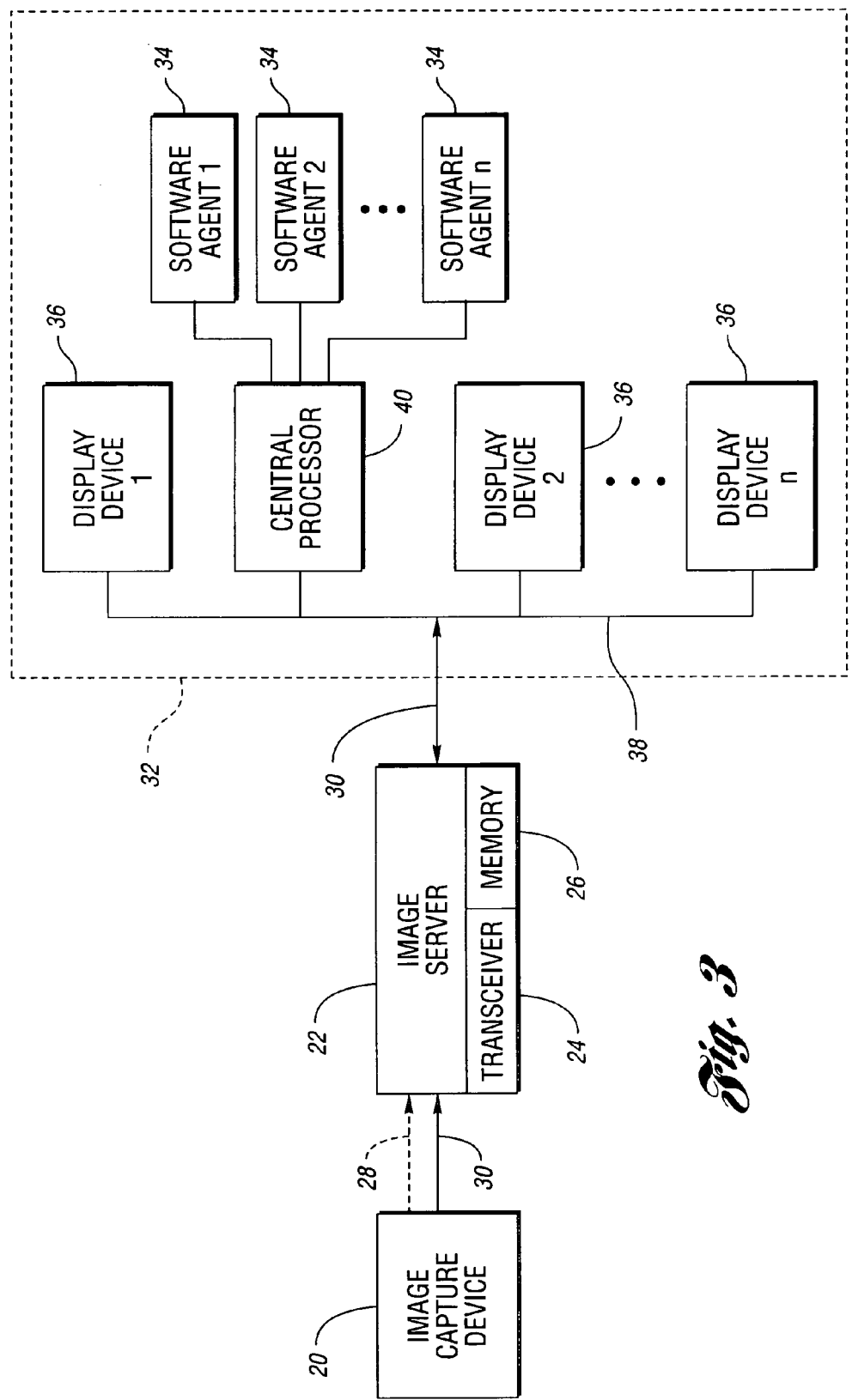
FIG. 3 is an alternative embodiment of the system of FIG. 2.

In the embodiment depicted in FIG. 2, software agents 34 are associated with each display device 36 and configured locally. Alternatively, as shown in the embodiment of FIG. 3, a central processor 40, such as a personal computer, can be provided in communication with display devices 36 to serve as an interface for programming software agents 34 that evaluate and select digital images and distribute them to the various display devices 36.

Figure 4:
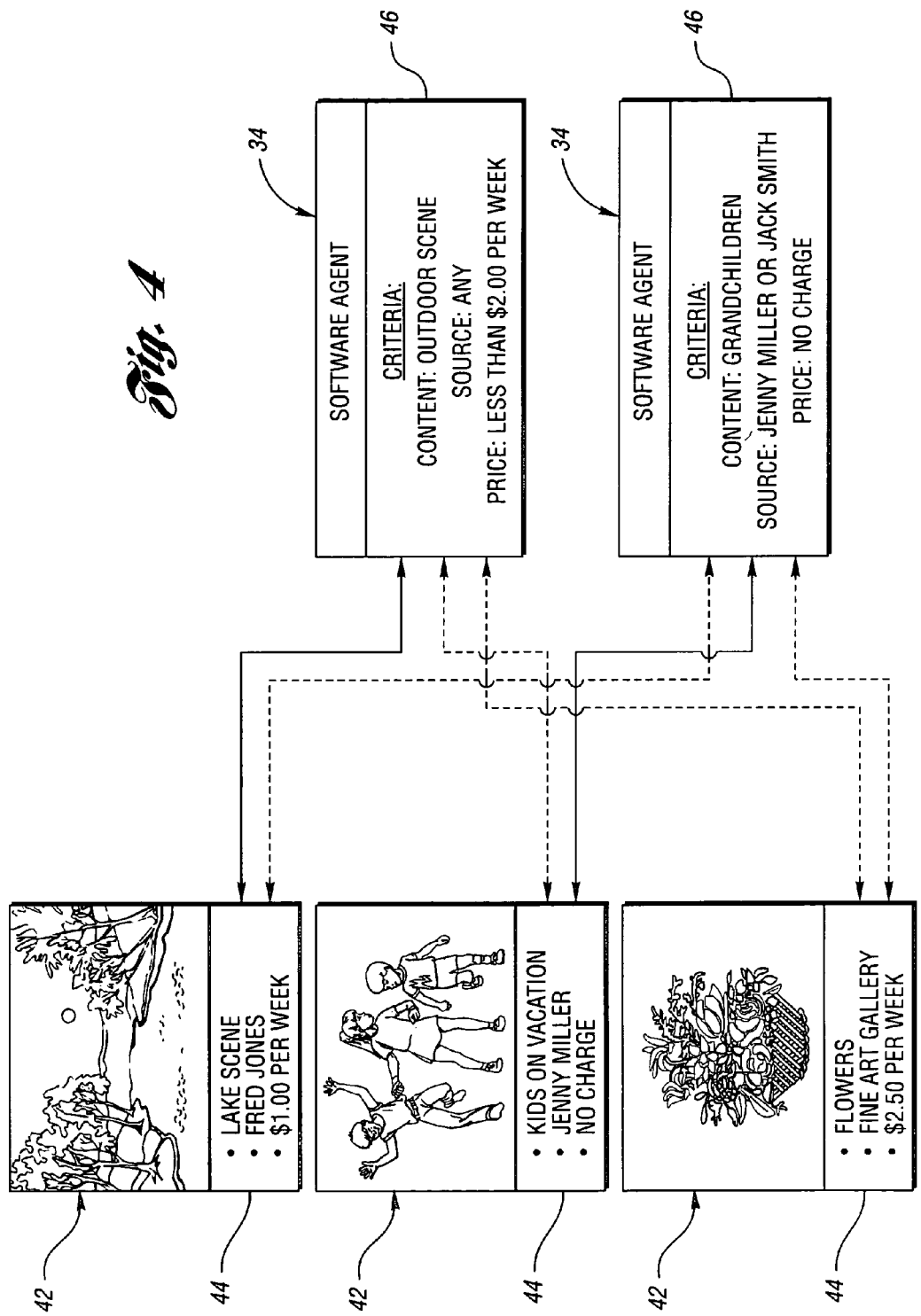
FIG. 4 is a schematic illustration of the selection of a digital image by software agents.

Referring now to FIG. 4, a schematic illustration of the selection of a digital image 42 of software agents 34 is shown. In a preferred embodiment digital images 42 include "metadata" 44, or information about the digital images 42. For example, metadata 44 can include the source, date, and/or description of the photograph, or even an accompanying recorded voice-over. Metadata 44 could be added to digital images 42 by the source photographer or a gallery, or might be generated automatically by image analysis software at image server 22 or other locations.

Therefore, in operation, software agent 34 can compare its programmed criteria 46 with the digital image metadata 44 to select the appropriate subset of digital images 42 for distribution to display devices 36. Software agents 34 can poll all image servers 22 containing digital images 42 that are made available to the public, looking to match the specified criteria 46. Alternatively, software agents 34 can be directed to poll only a particular image server 22 know to contain the images 42 of interest. As described above, software agents 34 can specify content, source, price, schedules, or any other selection criteria for digital images 42. Furthermore, software agents 34 manage the display of digital images 42 on each display device 36 according to any instructions that are included with the image metadata 44. As such, digital images 42 can be rotated at scheduled time periods, multiple images 42 can be displayed, or selection lists can be displayed, depending on the configuration of software agents 34.

In the examples depicted in FIG. 4, one user wishes to find an outdoor scene to display in an electronic picture frame above his fireplace, while another user wishes to display pictures of her grandchildren on her refrigerator whenever they are taken by her children. When matches are found (indicated by solid lines in FIG. 4), software agents 34 may authorize a transfer of images 42 from image servers 22 to particular display devices 36. Since images 42 may have prices, software agents 34 can have negotiation rules and tools such as an electronic wallet with authorized spending limits. End users could pay a fee to belong to a distribution network, or image transfer transactions could be metered. For example, an end user might be willing to pay any provider as much as $1 for an image 42 that will persist for a week. If a digital image 42 comes with restrictions such as, for example, the time period for which the image 42 can be displayed, then software agents 34 can monitor the restrictions and act accordingly.

In another example, an end user might only be interested in displaying images 42 provided by a gallery to which she subscribes. The galleries would make their images 42 available to software agents 34, and transactions or usage of images 42 would involve a fee. The gallery would contract with a particular image server 22, identify all images 42 appropriately, and the subscriber would then direct software agents 34 to poll the gallery's designated image server 22.

Alternatively, the gallery might push images 42 from a particular artist to the subscriber. The subscriber may then decide to "buy" one of the images 42 to display.

As still another example, a vendor might wish to broadcast an image 42, such as a coupon, for display in consumer's homes. For example, a pizza vendor could give away display frames having a pre-programmed software agent that displays the pizza vendor's specials and phone number every evening. Similarly, a content provider, such as a television broadcaster, might wish to send images 42 to consumers as a tie-in to television programming. For example, images 42 corresponding to an upcoming television program or music concert might be routed to subscribers' homes for display prior to and during broadcast of the program.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system, comprising:
   at least one computing device configured to store digital images received from one or more image sources; and
   at least one processor in communication with the at least one computing device, the at least one processor configured to use a plurality of sets of picture-frame-specific user-specified criteria for periodically selecting new digital images to update corresponding images displayed on electronic picture frames at a premises, the sets of picture-frame specific user-specified criteria each comprising a desired source of the digital images and an image rotation schedule, wherein different sets of picture-frame specific user-specified criteria are established for different picture frames at the premises, and for each set of picture-frame specific user-specified criteria the processor is configured to automatically compare the picture-frame specific user-specified criteria with metadata of the stored digital images at the computing device during a first time period according to the image rotation schedule to select digital images from the desired source for distribution to a corresponding picture frame, and to automatically compare the picture-frame specific user-specified criteria with metadata of additional digital images added to the computing device during a second time period after the first time period.

2. The system of claim 1, wherein the sets of picture-frame specific user-specified criteria comprise, for each of the picture frames, a purchase cost limit to be applied when periodically selecting new images for display on the picture frames.

3. The system of claim 2, wherein the purchase cost limit comprises a time duration.

4. The system of claim 1, wherein the at least one processor is further configured to automatically search for new images to display on the electronic picture frames based on image preference, price negotiation rules and image rotation schedules for each of the electronic picture frames.

5. The system of claim 1, wherein the at least one processor is further configured to enforce one or more display restrictions of one of the additional digital images that is selected for a first picture frame.

6. The system of claim 1, wherein the at least one processor is further configured to automatically display a tie-in image, corresponding to a video program, on a first picture frame during presentation of the program on a television proximate to the first picture frame.

7. The system of claim 6, wherein the first picture frame is a computing device.

8. The system of claim 6, wherein the at least one processor is further configured to display the tie-in image on the first picture frame prior to a scheduled broadcast time of the video program.

9. A method, comprising:
   receiving, by a computing device, digital images from one or more image sources;
   using a plurality of sets of picture-frame-specific user-specified criteria for periodically selecting new digital images to update corresponding images displayed on electronic picture frames at a premises, the sets of picture-frame specific user-specified criteria each comprising a desired source of the digital images and an image rotation schedule, wherein different sets of picture-frame specific user-specified criteria are established for different picture frames at the premises;
   for each set of picture-frame specific user-specified criteria, automatically comparing the picture-frame specific user-specified criteria with metadata of the digital images at the computing device during a first time period according to the image rotation schedule to select digital images from the desired source for distribution to a corresponding picture frame; and
   automatically comparing the picture-frame specific user-specified criteria with metadata of additional digital images received by the computing device during a second time period after the first time period.

10. The method of claim 9, wherein the sets of picture-frame specific user-specified criteria comprise, for each of the picture frames, a purchase cost limit to be applied when periodically selecting new images for display on the picture frames.

11. The method of claim 10, wherein the purchase cost limit comprises a time duration.

12. The method of claim 9, further comprising searching for new images to display on the electronic picture frames based on image preference, price negotiation rules and image rotation schedules for each of the electronic picture frames.

13. The method of claim 9, further comprising enforcing one or more display restrictions of one of the additional digital images that is selected for a first picture frame.

14. The method of claim 9, further comprising displaying a tie-in image, corresponding to a video program, on a first picture frame during presentation of the program on a television proximate to the first picture frame.

15. The method of claim 14, wherein the first picture frame is a computing device.

16. The method of claim 14, further comprising displaying the tie-in image on the first picture frame prior to a scheduled broadcast time of the video program.

* * * * *